June 1, 1965 L. E. DE NEERGAARD 3,187,314
ELECTROMAGNETIC RESOLVER

Filed Sept. 1, 1959 2 Sheets-Sheet 1

INVENTOR.
Leif Eric DeNeergaard, Deceased
BY Northern Trust Co., Executor
BY Parker & Carter
Attorneys.

June 1, 1965  L. E. DE NEERGAARD  3,187,314
ELECTROMAGNETIC RESOLVER
Filed Sept. 1, 1959  2 Sheets-Sheet 2
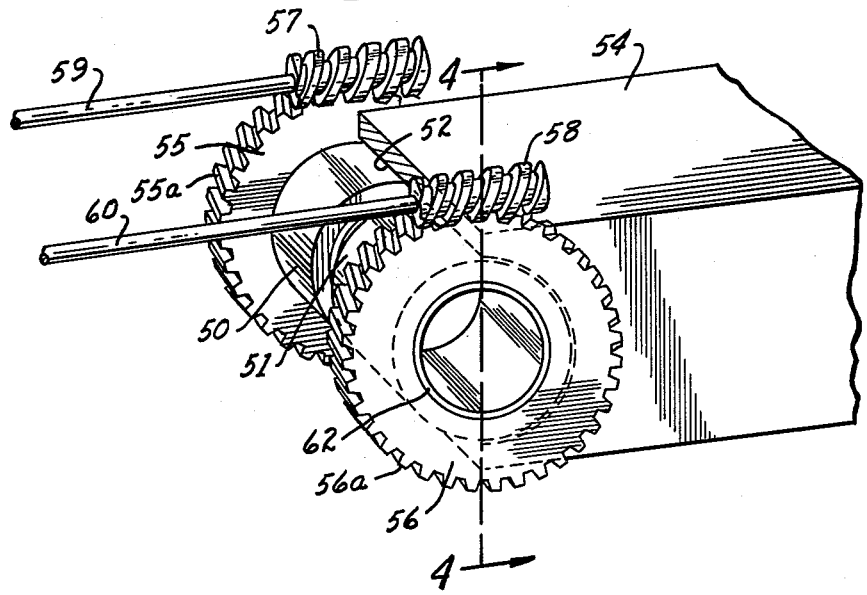
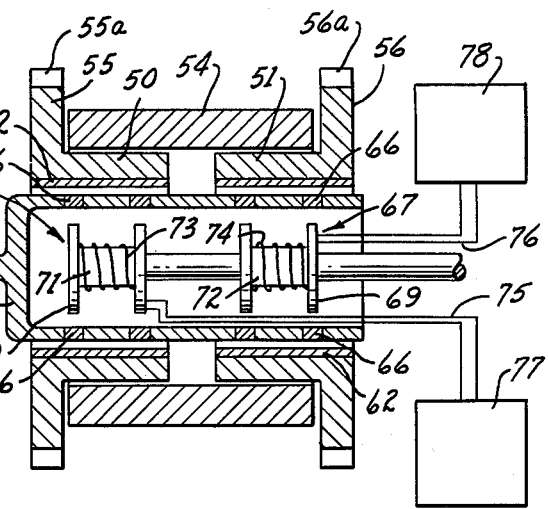
INVENTOR.
Leif Eric De Neergaard, Deceased
By Northern Trust Co., Executor
By Parker & Carter
Attorneys.

# United States Patent Office 3,187,314
Patented June 1, 1965

3,187,314
ELECTROMAGNETIC RESOLVER
Leif Eric de Neergaard, deceased, late of Chicago, Ill., by The Northern Trust Company, executor, Chicago, Ill., assignor to Frederic W. Olmstead, Washington, D.C., Hans W. Trechsel, Madison, Wis., Deryck A. Gerard, Minneapolis, Minn., and Norman S. Parker, Evanston, Ill., as trustees
Filed Sept. 1, 1959, Ser. No. 837,478
9 Claims. (Cl. 340—174.1)

This invention is directed to a new and improved form of electric resolver.

One object of the present invention is a simple and efficient electric resolver which accurately transmits the angular position of a rotatable member into a corresponding electrical degree phase displacement in a cyclic signal.

Another object is a simple and efficient electric resolver which does not require the use of slip-rings and brushes in the generation of a cyclic signal.

Another object is a simple electrical resolver which may be efficiently used with extremely delicate measuring equipment for translating movement of an indicating member into a corresponding phase displacement in a cyclic signal.

Another object is an electromagnetic resolver structure for transmitting variable phase signals and which may be easily reset to a zero phase displacement reading and at any desired rotative position of a rotatable member.

Another object is an electromagnetic resolver which may be efficiently used in extremely small and delicate measuring environments.

Another object is an electrical resolver wherein the angular movement of a plurality of members may be translated in phase change in a plurality of electrical signals.

Other objects will appear from a reading of the specification and claims which follow.

Figure 1:
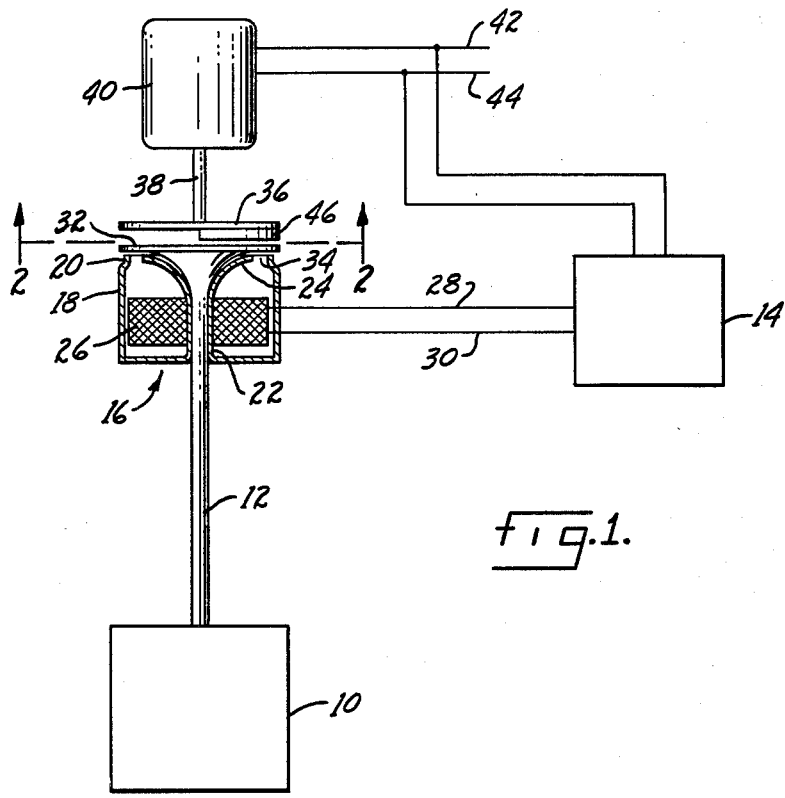
Figure 2:
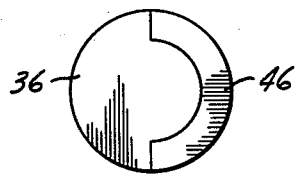

Referring generally now to the drawings:
FIGURE 1 is a diagrammatic view of the present invention;
FIGURE 2 is a plan view of one of the elements utilized in the invention illustrated in FIGURE 1 and looking in the direction of the arrows 2—2 of FIGURE 1;
FIGURE 3 is a partial perspective view of a further form of the invention; and
FIGURE 4 is a section taken along line 4—4 of FIGURE 3.

Like elements are illustrated by like characters throughout the specification and drawings.

Referring now to the drawings and in the first instance to FIGURE 1, any suitable measuring device 10 is shown which has an output shaft 12. The measuring device 10 should be taken as representative of a volt meter, thermocouple, pressure gauge or other instrument which is capable of indicating the magnitude of a quantity or quality in terms of degrees of angular rotation of the shaft 12. It should be understood that the measuring device 10 in and of itself forms no part of the present invention and it is shown in the drawings only for purposes of enabling a better understanding of the present invention. Shown generally at 14 is any suitable indicating instrument which is phase sensitive and is adapted to give a reading of the magnitude of the physical quantity or quality measured by the device 10. It may have a dial calibrated in units of the quantity or quality measured.

In accordance with the present invention, an induction coil assembly 16 is positioned around the upper end of the shaft 12. The induction coil assembly 16 includes an outer shell assembly 18 which is generally cylindrical in form and which terminates at its upper end in a flux lip 20. Positioned centrally of the shell 18 is an upstanding tube or member 22 which in the form shown, is unitary with the outer shell 18. The upstanding portion 22 is shown in bearing relation to the shaft 12 and terminates at its upper end in a circular lip 24 which may be concentric with the axis of the shaft and spaced a slight amount from the circular lip 20. An induction coil 26 is disposed about the upstanding portion 22 and includes leads 28 and 30 leading to the indicating instrument 14. The magnetic loop formed by the shell 18 and upstanding portion 22 may be formed of Mumetal, Silicon Steel or other well known material having relatively high permeabilities to low flux densities. Materials for this purpose are well known to the art and it is not thought necessary to describe them in detail. The upper end of the shaft 12 carries a magnetic storage member 32 which may be in the form of a disc which may be cemented or otherwise secured to the uppermost end of the shaft 12. It is preferably so positioned that it is concentric with and overlies the gap 34 between the lips 20 and 24. It is spaced a very slight clearance distance away from the upper ends of these lips.

Opposed to the storage member 32 is a scanning disc 36 which is carried by the shaft 38 of a synchronous motor 40. The synchronous motor is energized through suitable leads 42 and 44 from any suitable source of alternating current. The disc 36 includes a portion 46 which is positioned between the main body portion of the disc 36 and the storage member 32. The portion 46 may be formed from Mumetal or other similar magnetic material such as in the magnetic loop associated with the induction coil assembly. In the form shown and as appears most clearly in FIGURE 2, the portion 46 may have the shape of the semi-circular arc with a radial width less than the full radius of the disc. During rotation of the scanning disc 36 the scanning portion 46 will move in a circular path over the gap between the lips 20 and 24.

In accordance with the principles of the invention a magnetized pattern is formed on the storage member 32 and is so formed as to have the same general shape and configuration as the scanning portion 46. This is accomplished, for example, by supplying a source of alternating current to the induction coil 26. The alternating current supplied may be taken from the leads 42 and 44 so that the frequency induced in the coil 26 is the same as the frequency supplied to the scanning motor 40. When a source of alternating current is supplied to the induction coil it creates a flux path through the lips 20 and 24 and through the body of the storage member 32. When the scaning disc 36 is rotating at the same speed as the frequency supplied to the motor 40 and the frequency supplied to the coil 26, maximum flux will occur in the record repetitively at the same relative angular position of the portion 46. The scanning portion 46 exerts a regulatory effect upon the flux in the lips 20 and 24. It may be assumed, for example, that the regulatory portion 46 will shunt or divert flux from the storage member 32 over that area which is immediately beneath the portion 46. The area of the record beneath the remainder of the disc 36 is subjected to a different magnitude of flux. Thus the scanner has the effect of creating differential flux areas on the storage member 32. One such area will have the general area and configuration of the portion 46.

After the magnetic pattern has been established on the storage member 32, the resolver is ready for use in translating angular motion of the shaft into a corresponding phase displacement of a signal supplied to the indicating instrument 14. In such use, for example, the scanning motor 40 will be continuously rotated at a speed corresponding to the frequency supplied to the motor. The scanning area 46 will thus move across the magnetic pattern on the storage member 32 at the same rate. If the"

speed of rotation of the scanning disc 36 is 60 revolution per second in accordance with a 60-cycle per second signal, and the storage member 32 is stationary the scanning portion 46 will traverse the magnetized pattern on the storage member 32, 60 times a second. The magnetized pattern on the storage member 32 establishes a flux path through the lips 20 and 24 at those areas immediately adjacent to the pattern. As the regulating member 46 moves across the pattern on the storage member it will modulate this flux and will modulate the flux at a frequency corresponding to the scanning rate. Thus if the storage member 32 is stationary and the scanning disc is moving at the speed of 60 revolution per second, a 60-cycle per second signal will be induced in the coil 26 and transmitted to the indicating instrument 14.

When the measuring device reflects a small change in the quantity or quality being measured, as by a small angular movement of the shaft 12, the magnetized pattern will be advanced or retracted with relation to the scanning disc depending upon the direction of rotation of the scanning disc. Since the amplitude of the signal induced in the coil 26 is dependent upon the relative position of the scanning portion 46 and the magnetized area on the storage member 32, it will be seen that the phase of the signal induced will be changed in proportion to the extent of angular movement of the shaft 12.

The indicating instrument 14 may be phase sensitive. It may, for example, take the form of a phase angle meter calibrated in terms of the physical quantity being measured. If it takes this form the signal supplied to the motor 40 may be compared with the phase of the signal supplied from the coil 26 and the relative phase relations will move the indicating member proportionately.

Although it is not shown in the drawings, it should be understood that the scanning disc 36 may be balanced by filling in the material or areas not covered by the scanning portion 46 with material having little or no magnetic flux conductive properties. Furthermore, if desired, a small sheet of plastic or other material may be positioned between the scanner and the storage member 32 so as to minimize any windage effect from the rotation of the scanning disc 36 on the storage member 32.

A major advantage of the system is that with any angular position of the shaft 12, the resolver may be quickly set so that the indicating instrument 14 gives a zero reading for that particular angular position. This may be accomplished, for example, by erasing the magnetized pattern formed on the storage member 32 with an erasing coil (not illustrated). Erasing instrumentalities of this general type are well known in the magnetic recording art and it is not thought necessary to illustrate or describe them in detail. After erasure, the shaft 12 may be moved to the position which is desired to represent a zero reading, or any other particular reading. When in this position an external signal of the same frequency as that supplied to the motor 40 is supplied to the coil 26 and a magnetized area will be formed on the storage member 32 at an angular position corresponding to the time when the signal supplied is at a maximum and corresponding to the position of the scanning portion 46 at this instant. After so recording the magnetized pattern, the resolver is ready for use with the angular position of the shaft 12 representing the "in phase" condition of the signals or the zero reading.

A further form of the invention in which there may be a plurality of inputs and a plurality of outputs but only one movable scanner is shown in FIGURES 3 and 4. In this form of the invention suitable drums 50 and 51 are positioned within an opening 52 in a cover plate or the like 54. Each of the drums 50 and 51 have outwardly projecting circumferential flanges 55 and 56, the outer periphery of which are formed into driving surfaces or gear-like surfaces 55a and 56a. Each of the surfaces 55a, 56a are positioned adjacent worms 57 and 58. The worms in turn are suitably secured on the ends of shafts 59 and 60. It will be seen then that rotation of the shafts 59 and 60 will cause the worms to rotate the drums 50 and 51 within the cover plate 54. If the shafts 59 and 60 are each connected to a measuring device such as shown at 10 in FIGURE 1, the quantity or quality measured is translated into angular movement of drums 50, 51.

The inner surface of each of the drums may be suitably coated with a layer of a magnetic material 62 so that the drums form magnetic storage members. Positioned inside the drums is a cylindrical scanner 63, formed of a non-magnetic material, which is rotated by means of a shaft 64 and synchronous motor 65. The cylindrical scanner 63 may have a plurality of inserts 66 which may be formed of Mumetal or any other similar material having relatively high permeability to low flux densities.

Positioned inside the scanner 63 are a plurality, in this case two spools 67 and 68, which have outwardly extending flanges or lips 69 and 70 formed of a suitable ferromagnetic material and have inner cores 71 and 72 surrounded by suitable coils 73 and 74. Each of the outwardly extending lips are positioned opposite the Mumetal inserts in the rotatable scanner and are also positioned opposite the layer of magnetic material placed on the inner surface of the drums 50 and 51. Leads 75, 76 connect each of the coils to indicators 77 and 78.

The operation of the device shown herein is substantially similar to the operation of the device shown in FIGURES 1 and 2. However, in this case, there are a plurality of inputs and a plurality of outputs and only one rotating part. In the operation of this device the inner surfaces of the drums 50 and 51 are first magnetized so that a magnetic pattern is placed thereon. The magnetic pattern is formed by flowing an electric current having the same frequency as the frequency of the signal driving the synchronous motor 65 through the coils so that a magnetic flux path is established from the lips 69 and 70 through the Mumetal inserts and to the inner surfaces of the drums 50 and 51. The alternating current in the coil will reach a peak each time the inserts are in the same position relative to the drums. This forms a magnetic pattern or areas of different magnetic flux densities on the inner surfaces of the drums. Both the storage members may have identical patterns if all the inserts have the same relative angular positions. In the preferred form, the Mumetal inserts are semi-circular, however, it should be understood that there may be two inserts each diametrically opposed and each covering one-fourth of the circumference. If that is the case the signal generated by the resolver will be twice the frequency of a signal generated by a single insert covering half the circumference. Each pair of inserts may be identically positioned in the scanner or they may be angularly displaced relative to each other.

After the magnetic pattern has been established the device can then operate as a resolver. The operation is as described before in that cyclic signals are induced in the coils by the magnetic flux pattern on the storage members and the rotating Mumetal inserts. Any angular movement of the shafts 59 and 60 will rotate the drums 50 and 51 and change the angular position of the magnetic patterns on the inside of the drum. The signals induced in the coils then will be displaced in phase as the maximum flux induced in the coil will be displaced in time because of the different angular position of the magnetic storage member. It should be realized that each of the drums may be rotated independent of each other so that there may be two inputs and two outputs. It should also be realized that whereas there have only been shown two drums and two spools there may be any number of drums and spools used in conjunction with the single synchronous motor and single scanner.

The drums 50 and 51 with their inner layers of magnetic material perform the same function as the storage member 32 in FIGURE 1. The inserts 66 perform the same function as the portion 46 on the disc 36 of FIGURE 1, the disc performing the same function as the rotating scanner 63.

Those forms of the invention previously described, both the form in FIGURES 1 and 2 and the form of FIGURES 3 and 4, have been described as including one or two sections of magnetic material, such as the portion 46 on disc 36 and the inserts 66. It should be realized that the invention is not restricted to only one or two of these magnetic areas. For example, in the form of FIGURES 1 and 2 there may be two, three or any number of magnetic portions or areas formed on the disc 36. These areas may be equally spaced around the disc. When there is such a plurality of scanning areas the frequency of the signal produced by the resolver will be a multiple of the frequency of the scanning motor. For example, if there are ten scanning areas the frequency of the signal produced in the coil will be ten times the frequency of the scanning motor. The same is true for the form shown in the FIGURES 3 and 4, as there may be any number of magnetic inserts, such as shown at 66, spaced around the rotating scanner 63. The number of inserts will determine the frequency of the signal produced in the coils, which frequency will be a multiple of the frequency of the signal driving the motor 65.

The frequency of the motor has been described as being the same as the frequency of the signal in the coils. This may not always be the case, depending on the number of poles in the motor. The important thing is that there be a definite relationship between the frequencies.

In both forms of the invention the phase of the signal from the coils has been compared with the phase of the signal driving the synchronous motor. The signal from the coil may however be compared with an outside source. Additionally, in the form of FIGURES 3 and 4 the signal from one coil may be compared with that of another. In other words, one coil may produce a base signal and the other coil or group of other coils may be compared, in phase relationship, with the signal from the base coil. When the invention is so used the motor 65 need not be a synchronous motor.

Whereas the structure and method shown herein has been described as a resolver which translates angular movement of a member into phase change of an electrical signal, this same structure can also be used as a phase memory cell. For example, if the disc 36 or the drums 50 and 51 are held in any one position and the signal in the coils differs in phase from the signal applied to the synchronous motor, a magnetic pattern representing this phase difference will be found on the storage members. If later it is desired to use the phase difference, the synchronous motor can be excited by a signal having a phase which is to be compared with that recorded. The signal induced in the coils can be compared with the signal driving the motor to get the desired phase difference.

Whereas there have been shown and described an operative form of the invention, it should be understood that this showing and description is illustrative or diagrammatic only. There are many modifications of the invention which will fall within the space and spirit thereof and which will be apparent to those skilled in the art. The scope of the invention should be limited only by the scope of the hereinafter appended claims.

What is claimed is:

1. An electromagnetic resolver including a magnetic storage member having areas of different flux density thereon, a rotatable scanning member, said scanning member carrying at least one generally arcuate member having predetermined magnetic flux conductive properties, said arcuate member being positioned adjacent said storage member, an induction element adjacent said storage member adapted to establish a magnetic flux path therebetween, means for transmitting an electrical signal from said induction element, said storage member being rotatable with respect to said scanning member, means for rotating said scanning member at a predetermined speed to thereby continuously generate a cyclic signal of a predetermined frequency in said induction element, rotation of said flux storage member, during rotation of said scanning member, being effective to produce a phase change in the signal generated.

2. The method of resolving rotational movement of a member into a proportional phase change of a cyclic signal including the steps of maintaining a flux path from a pattern on a rotatable magnetic storage member, continuously rotationally scanning the pattern in a direction parallel to a direction of rotation of said magnetic storage member at a constant rate whereby flux in said path is varied at the scanning rate to generate a cyclic signal, and rotating said pattern in directions parallel to the direction of scanning whereby a signal phase change said cyclic signal is effected in proportion to the amount of rotation of said magnetic storage member.

3. The method of resolving angular movement of a rotatable member into a proportional phase displacement of a cyclic signal including the steps of supporting a magnetic storage member for angular movement about an axis of rotation of a rotatable member, providing a magnetic flux emissive area on said magnetic storage member, continuously rotationally scanning said area at a predetermined rate in order to generate a signal having a predetermined frequency, and rotating said area in a direction parallel to the direction of scanning in response to angular movement of said rotatable member to thereby produce a phase change in the signal generated.

4. An electrical resolver including a rotatable shaft and a magnetic storage member coupled to said shaft for rotational movement therewith, said magnetic storage member having a magnetic flux emissive area thereon whereby upon rotational movement of said shaft said area moves in a circular path with respect to the axis of rotational movement, an induction element and means establishing a flux path from said area to said induction element, a rotatable scanner, means for rotating said scanner at a predetermined rate and in a direction parallel to the direction of movement of said area during rotation of said shaft, whereby when said baud is stationary a signal having a frequency in consonance with the predetermined rate is generated and when said area moves a phase change in the signal results.

5. An electromagnetic resolver including a magnetic storage member, a rotatable scanning member, said scanning member carrying at least one generally arcuate member having predetermined magnetic flux conductive properties, said arcuate member being positioned adjacent said storage member, an induction element adjacent said storage member adapted to establish a magnetic flux path therebetween, means for transmitting an electrical signal to said induction element, means for rotating said scanning member at a predetermined rate the arcuate member on the rotating scanning member cooperating with the signal supplied to said induction element to establish areas of different magnetic density on said magnetic storage member in accordance with the signal supplied to said induction element.

6. An electromagnetic resolver including a plurality of magnetic storage members having areas of different flux density thereon, a rotatable scanning member positioned adjacent said storage members and having areas of different flux transmissiveness, a plurality of induction elements positioned to establish a magnetic flux path to said storage members, means for transmitting an electrical signal from each of said induction elements, said storage members being rotatable with respect to said scanning member, means for rotating said scanning member at a predetermined speed to modulate said flux so as to generate a signal of a predetermined frequency in each of said induction elements, rotation of each of said flux storage members, during rotation of said scanning member, being effective to produce a phase change in each of the signals generated.

7. An electromagnetic resolver including a plurality of cylindrical storage members, the inner surfaces of which have areas of different flux density, a cylindrical rotatable scanning member positioned within said storage members and having areas of different flux transmissiveness, a plurality of induction elements positioned within said scanner and adapted to establish a flux path to said storage members, means for transmitting electrical signals from said induction elements, said storage members being rotatable with respect to said scanning member, means for rotating said scanning member at a predetermined speed to modulate said flux so as to generate a signal of a predetermined frequency in each of said induction elements, rotation of said storage members, during rotation of said scanning member, being effective to produce a phase change in each of the signals generated.

8. The structure of claim 7 wherein said scanning member has two defined areas of high permeability adjacent each of said storage members, each of said induction elements having two outwardly extending lips adjacent said defined areas to thereby form a flux path through said defined areas to said storage members.

9. The structure of claim 8 wherein said defined areas extend generally half the circumference of the scanner.

References Cited by the Examiner
UNITED STATES PATENTS

| 1,945,626 | 2/34 | Baird | 179—100.2 |
| 2,141,208 | 12/38 | Eaves | 181—5 XR |
| 2,383,460 | 8/45 | Purves et al. | 324—43 XR |
| 2,605,344 | 7/52 | Brattain et al. | 340—345 |
| 2,680,241 | 6/54 | Gridley | 340—174 X |
| 2,740,946 | 4/56 | Geneslay | 340—14 XR |
| 2,782,626 | 2/57 | Jochum et al. | 179—100.1 |
| 2,786,978 | 3/57 | Warner | 340—174 |
| 2,934,824 | 5/60 | Braybrook et al. | 340—206 |
| 3,133,150 | 5/64 | Camras | 346—74 |

IRVING L. SRAGOW, *Primary Examiner.*

EVERETT R. REYNOLDS, STEPHEN W. CAPELLI, *Examiners.*